Sept. 20, 1960    E. W. WASSING    2,952,937
FISHING TACKLE
Filed Dec. 23, 1958
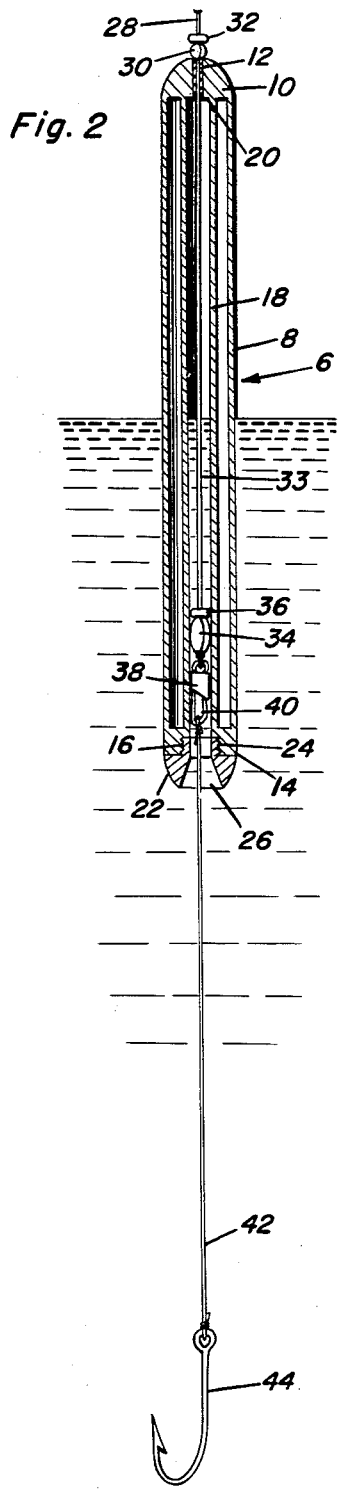
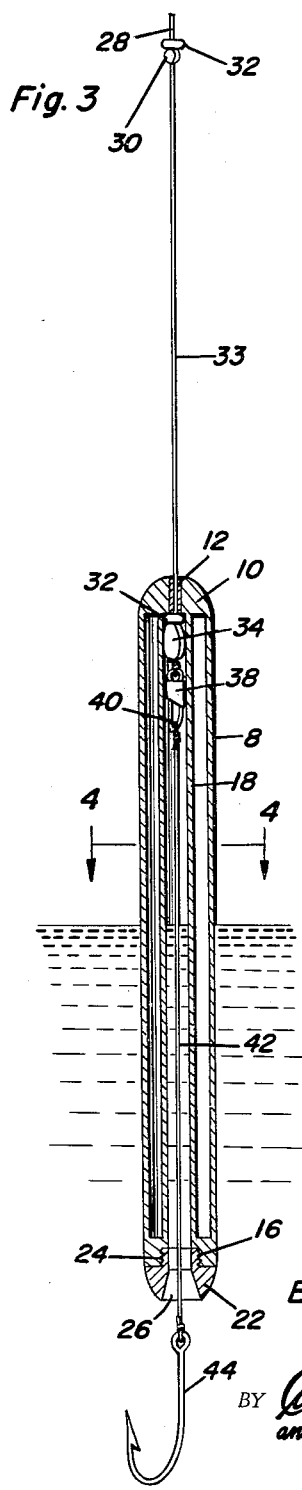
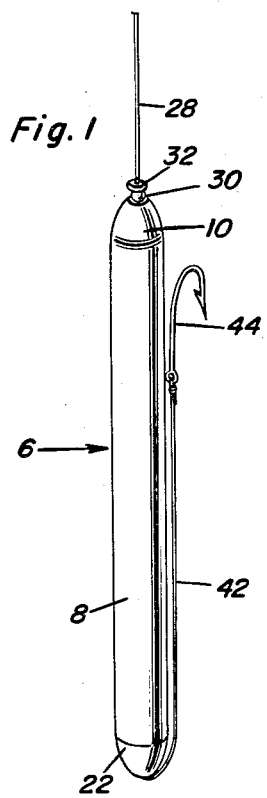
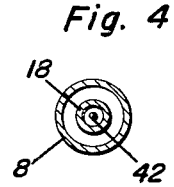
Edwin W. Wassing
INVENTOR.

2,952,937

FISHING TACKLE

Edwin W. Wassing, 1748 W. Burnett, Louisville 10, Ky.

Filed Dec. 23, 1958, Ser. No. 782,567

2 Claims. (Cl. 43—43.15)

The present invention relates, broadly construed to certain new and useful improvements in fishing tackle, but has reference, more specifically, to a structurally distinct float and the combination therewith of an especially equipped fishing line.

One asepct of the invention has to do with the float itself. That is to say, this float comprises a vertically elongated hollow buoyant body having a central axial barrel embodied therein and defining a line passage. The lower or leading end of the body is provided with a readily applicable and removable suitably weighted nose cone or collar which constitutes a sinker and functions to maintain the float in the desired upright position while fishing. More explicitly, the lower or leading end of the body is provided with a screw-threaded socket in alignment with the corresponding end of the line passage, said socket adapted to accommodate a screw-threaded neck on the upper end of the weighted collar or sinker. In addition the lower end of the opening through the collar and also the neck is of importance in that it is funnel-shaped for a purpose to be hereinafter described.

Novelty is also predicated on the upper end of the body which has a reduced bore constituting a part of the passage and in alignment with the upper end of the barrel which construction serves to provide a limiting shoulder. The purpose of this shoulder is to accommodate a rubber or an equivalent bead which is attached to that part of the line which is slidable in the passage. The cushioning properties of the bead, and with the bead cooperating with a sinker on the line, serve to protect the line.

The invention also features a suitably constructed and an adjustable stop in the form of a bead which is attached to that part of the line above the top of the body and makes it possible to regulate the amount of the line which descends into the passage. Further this construction is desirable in that by following this adjusting or regulating step and employing a leader of predetermined length, the likelihood of the hook on the end of the leader tangling with the part of the line above the float is reduced to a minimum.

Another object of the invention is to provide a float and line combination or assembly which is simple, efficient, practical and saleable and is capable of achieving end results which prior art devices similarly constructed and performing fail to do. Also and as experience has shown a fisherman using this improved tackle will not only be more satisfied with its resultfulness but will find that the number of operations heretofore required for casting and fishing are appreciably reduced.

Other objects, features and advantages will become more readily apparent from the following description and the accompanying drawing.

In the drawing, wherein like numerals are employed to designate like parts throughout the views:

Fig. 1 is a perspective view of the improved float and fishing line combination showing how the stopped line prevents the hook-equipped leader from reaching to the top of the float and tangling with the line proper.

Fig. 2 is a view in section and elevation and on an enlarged scale which may be said to be a central longitudinal sectional view.

Fig. 3 is a view similar to Fig. 1 but showing how the sinker-equipped end of the line, that is the portion within the passage or barrel, may be slid or drawn up to a position where the rubber bead constitutes a stop and engages the stop shoulder.

Fig. 4 is a cross-section on the line 4—4 of Fig. 3.

Referring now to the drawing the float as an entity is denoted by the numeral 6 and comprises a hollow elongated shell 8 defining a buoyant body. The upper end 10 of the body has a restricted line passage therethrough which is suitably lined with a bushing or the like as at 12. The lower end portion 14 has an axially disposed screw-threaded socket 16 formed therein. On the interior of the body is an axial barrel or bore 18 defining the principal portions of the line passage. This passage is open at its ends and therefore the barrel or bore 18 may be said to be aligned with the socket 16 at the bottom and the restricted passage 12 at the top. At this portion of the body a shoulder 20 is provided. The aforementioned collar comprises a suitable lead or an equivalent weight. This collar is denoted at 22 and the upper flattened end portion is provided with an upstanding screw-threaded neck 24 which screws into the socket. The opening through the collar, including the opening in the neck, may be said to be substantially truncated conical in form or in the form of a funnel as at 26. The portion 28 (Fig. 3) of the fishing line is provided with a split shot or bead 30 which is removably and adjustably attached to the line or may be simply held in an established stop forming position by way of a rubber band or the like as at 32. The purpose of this construction is to limit the descent of the portion 33 of the line into the line passage of the float. This is accomplished when the stop means 30 comes to rest against the upper end 10 of the float as brought in Figs. 1 and 2. There is a sinker 34 attached to the lower end portion of the line and interposed between the sinker and the shoulder 20 there is a rubber bead or equivalent compressibly resilient stop 36. This may be brought against the shoulder in the manner seen in Fig. 3. A swivel clasp-type leader fastener 38 is connected to the lower end portion of the line and the upper end 40 of the leader 42 is attached to this fastener. The leader is provided at its lower end with a conventional barbed or an equivalent fishhook 44.

It is believed that the invention in an over-all structural sense may be described either as a fishing float assembly or a float and an adjustable line combination, the same being characterized by the line portions 28 and 33 and the adjustable stop means 30 and 32 cooperable with the upper end portion 10 of the float. Novelty is also predicated on that portion 33 which passes through the restricted passage and into the main passage defined by the barrel 18 where it is provided with a sinker 34 and a cooperating stop 36 which is interposed between the sinker and the shoulder 20.

It is understood that the float will be preferably constructed of a suitable grade of commercial plastics and will be made hollow and thus buoyant. Of course, it can be made of other buoyant materials and can be constructed in various sizes, shapes and forms. Normally it will be about 12 inches long and about ¾ of an inch in diameter and preferably circular as shown and provided with the internal barrel 18. By reason of the construction shown and described the float will remain in an upright position in the water as shown in Figs. 2 and 3. Fig. 3 serves to show the retrieving step wherein the cushioned abutment or stop 36 engages the shoulder 22 and in which position the major portion of the leader is withdrawn into the line passage. Fig. 1 illustrates the relative relationship of the components after the cast has been made and before striking the water. Fig. 2 of course illustrates the arrangement of the components with the float operating on the surface and with a small sinker leader and hook submerged at shallow depth. The depth can be regulated by the aforementioned stop means 30 and 32.

It is evident that the float and line combination herein shown is a construction which will appeal to manufacturers in that it may be economically produced and sold. This float can be used with almost any kind of rod and reel including heavy duty surf rod constructions. The construction allows the bait to submerge slowly and naturally which is regarded as advantageous in fishing in that it serves to "tantalize" prospective victims. Not only this, the float can be used for jig fishing, used to cast artificial flies and to, as a matter of fact "jig" them at any desired depth. It is repeated that the hook end leader can be retracted or drawn up into the line passage when the retrieving step is started. Consequently, the sinker equipped end of the line is less likely to drag and become snagged. The weighted collar or sinker 22 with its screw-threaded neck bottom is a desirable feature in that collars of varying weights may be employed depending on the expected needs of the user. The funnel-shaped opening at the bottom allows free passage of the leader as well as the small rubber bead and sinker. The fact that the fisherman is able to choose the correct weight or sinker 22 is advantageous and important when one considers the difficulties of making a good cast. It is repeated that the construction is such that any desired depth can be fished and all kinds of fish small or large can be sought after. There are no knots tied in the fishing line or any complicated clamping devices that would chaff or damage the line. In fact, in order to change the sinker all that is necessary is to detach the loop end of the leader from the snap swivel 38. With this construction one can see to it that at no time should the leader 42 be more than twice than the length of the float.

In the construction illustrated the leader, being weaker than the fishing line, the leader will break and only the hook and leader will be lost. In some prior art construction a knot is tied in the fishing line in order to bring about the necessary adjustment for depth control. Consequently if a different depth is desired the knot must be untied and tied at a different location in the line. Naturally a knot tied into a thin fishing line cannot be united with the fingers. In fact, a sharp pointed instrument might be used consequently damaging the line.

Many other objectives, features and advantages will be evident, it is believed, to the reader. For this reason the explanation so far given would appear to be satisfactory and comprehensive. Under the circumstances a more extensive description is though to be unnecessary.

Minor changes in shape, size, materials and rearrangement of components may be resorted to in actual practice, if desired, and without departing from the spirit of the invention or the scope of the invention as claimed.

What is claimed as new is as follows:

1. A fishing float comprising a buoyant body having a fishing line passage extending therethrough, said passage being of predetermined as well as restricted cross-section and having a lower end provided with a screw-threaded socket aligned with said passage, a readily attachable and detachable body sinker having an axial opening aligned with said passage, said body sinker comprising a collar, the axial opening of said collar being of truncated conical form, the trailing truncated end of said opening merging with a reduced neck on said collar extending centrally above the top of the collar, said neck being screw-threaded and screwed into said screw-threaded socket, the upper end of said line passage being reduced in cross-section and providing a fishing line check shoulder, a fishing line having a lower end portion slidable in said passage, a line sinker attached to the lower end of said line and confined but freely slidable in said passage, a leader having a hook at one end, said leader being attached to the lower end of the line sinker by way of a snap-fastener and likewise slidable in said passage, and manually adjustable stop means carried by a portion of the line located above the upper end of said body, said stop means serving to limit the downward sliding of the line in said passage, said line sinker also serving to limit the upward travel of the line when in a position cooperating with said check shoulder, said leader being of a predetermined length so that the stop means may be set to limit the amount of the line which is permitted to pass downwardly in the passage, the portion of the leader and hook extending beyond the body sinker being shorter than the over-all length of the body whereby to, in this manner, prevent the hook on the end of the leader from reaching a point above the level of the upper end of the body and thus preventing the hook on the leader from tangling with that part of the line above the top of said body.

2. Fishing tackle including a float comprising an elongated buoyant body having an axial bore extending substantially the length of the body and being open at the lower end, a passage at the upper end of said body smaller in cross-section than the cross-section of said bore, being in axial alignment with and communicating with said bore thereby defining a shoulder, a fishing line having a lower end portion slidable in said passage and bore, a line sinker attached to the lower end of said line and being freely slidable in said bore, a leader having a fish hook at one end, said leader being attached to said line sinker and likewise being slidable in said passage, an adjustable stop carried by that portion of the fishing line adjacent to but above the upper end of said body, said stop being manually regulatable to limit the downward sliding of the line sinker and leader in said bore, said line sinker serving to limit the upward travel of the line when intentionally pulled up and engaged with said shoulder, said leader being of a predetermined length so that the stop means may be set to limit the amount of the line which is permitted to pass downwardly in the passage, so that the portion of the leader and hook extending beyond the lower end of the body is shorter than the over-all length of the body whereby, in this manner, to prevent the hook on the end of the leader from reaching a point above the level of the upper end of the body and thus minimizing the likelihood of the hook on the leader ever tangling with the part of the line above the top of said body, and a screw-threaded collar screwed on the lower leading end of said body, said collar being of a cross-section corresponding to the cross-section of the body and of a desired heaviness and constituting a buoyancy regulating sinker, said collar having an opening in axial alignment with said bore.

References Cited in the file of this patent

UNITED STATES PATENTS

| | | |
|---|---|---|
| 786,597 | Picken | Apr. 4, 1905 |
| 2,498,815 | McVay | Feb. 28, 1950 |
| 2,645,051 | Stofleth | July 14, 1953 |
| 2,651,136 | Kruze | Sept. 8, 1953 |

FOREIGN PATENTS

| | | |
|---|---|---|
| 926,589 | France | Apr. 21, 1947 |